US006996183B2

(12) United States Patent
Peterson et al.

(10) Patent No.: US 6,996,183 B2
(45) Date of Patent: Feb. 7, 2006

(54) SCENE CUT DETECTION IN A VIDEO BITSTREAM

(75) Inventors: Richard Mateer Peterson, East Windsor, NJ (US); Edmond Chalom, Highland Park, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 932 days.

(21) Appl. No.: 10/014,963

(22) Filed: Dec. 11, 2001

(65) Prior Publication Data

US 2003/0058947 A1    Mar. 27, 2003

Related U.S. Application Data

(60) Provisional application No. 60/324,890, filed on Sep. 26, 2001.

(51) Int. Cl.
 *H04N 7/12* (2006.01)
(52) U.S. Cl. ........... 375/240.24; 382/236; 348/699
(58) Field of Classification Search ........... 375/240.24, 375/240.16, 240.12, 240.13, 240.27; 382/236; 348/699
See application file for complete search history.

(56) References Cited

U.S. PATENT DOCUMENTS

| | | | | |
|---|---|---|---|---|
| 5,642,174 A | * | 6/1997 | Kazui et al. ................. 348/700 |
| 5,724,100 A | * | 3/1998 | Kuchibhotla ........... 375/240.24 |
| 5,731,835 A | | 3/1998 | Kuchibholta ................ 348/390 |
| 5,751,378 A | | 5/1998 | Chen et al. ................. 348/700 |
| 5,774,593 A | * | 6/1998 | Zick et al. ................... 382/236 |
| 5,835,149 A | | 11/1998 | Astle ........................... 348/419 |
| 5,872,598 A | | 2/1999 | Legall et al. ................ 348/405 |
| 5,949,953 A | | 9/1999 | Shirakawa et al. ........... 386/70 |
| 6,025,886 A | | 2/2000 | Koda ........................... 348/700 |
| 6,081,622 A | | 6/2000 | Carr et al. ................... 382/236 |
| 6,125,147 A | | 9/2000 | Florencio et al. ....... 375/240.39 |
| 6,205,174 B1 | | 3/2001 | Fert et al. .............. 375/240.03 |
| 6,229,925 B1 | | 5/2001 | Alexandre et al. .......... 382/239 |
| 6,233,278 B1 | | 5/2001 | Dieterich ............... 375/240.03 |
| 6,252,905 B1 | | 6/2001 | Pokrinchak et al. .... 375/240.14 |
| 6,259,736 B1 | | 7/2001 | Chujoh et al. .......... 375/240.13 |
| 6,735,253 B1 | * | 5/2004 | Chang et al. ........... 375/240.16 |
| 2001/0019631 A1 | | 9/2001 | Ohsawa et al. | |

OTHER PUBLICATIONS

PCT Search Report dated: Dec. 10, 2002.
"Image Processing Apparatus and Method, and Storage Medium", U.S. Appl. No. 09/750,152, filed: Dec. 29, 2000.

* cited by examiner

*Primary Examiner*—Gims Philippe
(74) *Attorney, Agent, or Firm*—Joseph S. Tripoli; Ronald H. Kurdyla; Guy H. Eriksen

(57) ABSTRACT

A method and apparatus are disclosed for detecting scene cuts in a video bitstream. The number of coded macroblocks for each of a plurality of potential scene cuts is determined. The number of predicted macroblocks for each of the plurality of potential scene cuts is determined. A ratio of the number of coded macroblocks to the number of predicted macroblocks for each of a plurality frames corresponding to the potential scene cuts is then calculated. A frame having the desired ratio is selected. The ratio of the selected frame is compared to a threshold value. A scene cut is reported as detected responsive to a determination that the ratio of the selected frame satisfies the threshold value.

22 Claims, 3 Drawing Sheets

SCENE CUT DETECTION IN A VIDEO BITSTREAM

CROSS REFERENCES TO RELATED APPLICATIONS

This application claims the benefit of U.S. Provisional Patent Application Ser. No. 60/324,890, filed Sep. 26, 2001.

FIELD OF THE INVENTION

The present invention relates to MPEG-type video, and more particularly to scene cut detection within video bitstream.

BACKGROUND OF THE INVENTION

MPEG-based video sequences can be divided into scenes that may vary from less than a second to minutes or more in length. Detection of these divisions or scene cuts makes possible a wide variety of value added features. For example, a frame can be selected from each scene to create a storyboard summarizing the contents of a video recording. Further, a video editor can be used to manipulate the video recording on a scene-by-scene basis, for example, re-ordering scenes or applying image-processing techniques to each frame in a scene.

MPEG video sequences include three types of frames, Intra-Frames (I), Inter-Frames (P), and Bi-Directional Frames (B). I frames encode a still image using a method similar to JPEG encoding. P frames are predicted from a previous I or P frame. B frames are predicted both from a previous I or P frame and a next I or P frame. These three types of frames are encoded using a Discrete Cosine Transform (DCT), which organizes redundancy in spatial directions between frames. However, for I frames, the DCT information is derived directly from an image sample, whereas for the P and B frames, the DCT information is derived from a residual error after prediction.

Each frame is divided into a plurality of macroblocks. Each macroblock includes information related to a plurality of luminance blocks, e.g., Y1, Y2, Y3 and Y4, and a plurality of chrominance blocks, e.g., one U and one V in a YUV system. Each of these blocks includes a plurality of pels, or picture elements, e.g., an 8×8 block.

When video has been encoded into an MPEG-like bitstream, scene cut detection can be done without fully decoding the bitstream, which increases the speed of video processing. Additional information, such as, macroblock encoding types, motion vectors, and DCT coefficients, may also be extracted from the bitstream without fully decoding the bitstream.

One method for scene cut detection is performed as follows:

1. For I frames, mean-square differences between DCT coefficients are determined;
2. For P frames, the proposed method determines the number of forward-predicted macroblocks;
3. For B frames, the lesser of the number of forward-coded macroblocks and the number of backward-coded macroblocks is counted; and
4. A minimum is then determined in a plot of these numbers versus frame number.

In another proposed method for scene cut detection: for I frames, a difference between color histograms built from DC coefficients is used, and combined with information about the ratio of the number of macroblocks without motion compensation to the number with motion compensation. The proposed method looks for a peak in a plot versus frame number. For B frames, the ratio of forward to backward predictions is determined. In all cases, a local adaptive threshold technique is implemented to identify peaks.

Yet another method makes use of histograms for all frames (I, P, and B) built from Discrete Cosine (DC) coefficients with motion compensation.

However, no known system or method currently exists for scene cut detection based on global examination of all of the predictions within a subgroup of pictures (GOP).

SUMMARY OF THE INVENTION

Scene cuts are detected based upon global examination of all of the predictions within a sub-GOP in accordance with the principles of the present invention. The number of coded macroblocks for each of a plurality of potential scene cuts are first detected. The number of predicted macroblocks for each of the plurality of potential scene cuts is then determined. The ratio of the number of coded macroblocks to the number of predicted macroblocks for each of a plurality of frames corresponding to the potential scene cuts is next determined. A frame having the desired ratio is selected. The ratio is compared to a threshold value. A scene cut is detected if it is determined that the ratio satisfies the threshold value.

BRIEF DESCRIPTION OF THE DRAWINGS

Preferred embodiments of the present invention will be described below in more detail, with reference to the accompanying drawings, in which.

DETAILED DESCRIPTION

Figure 1:
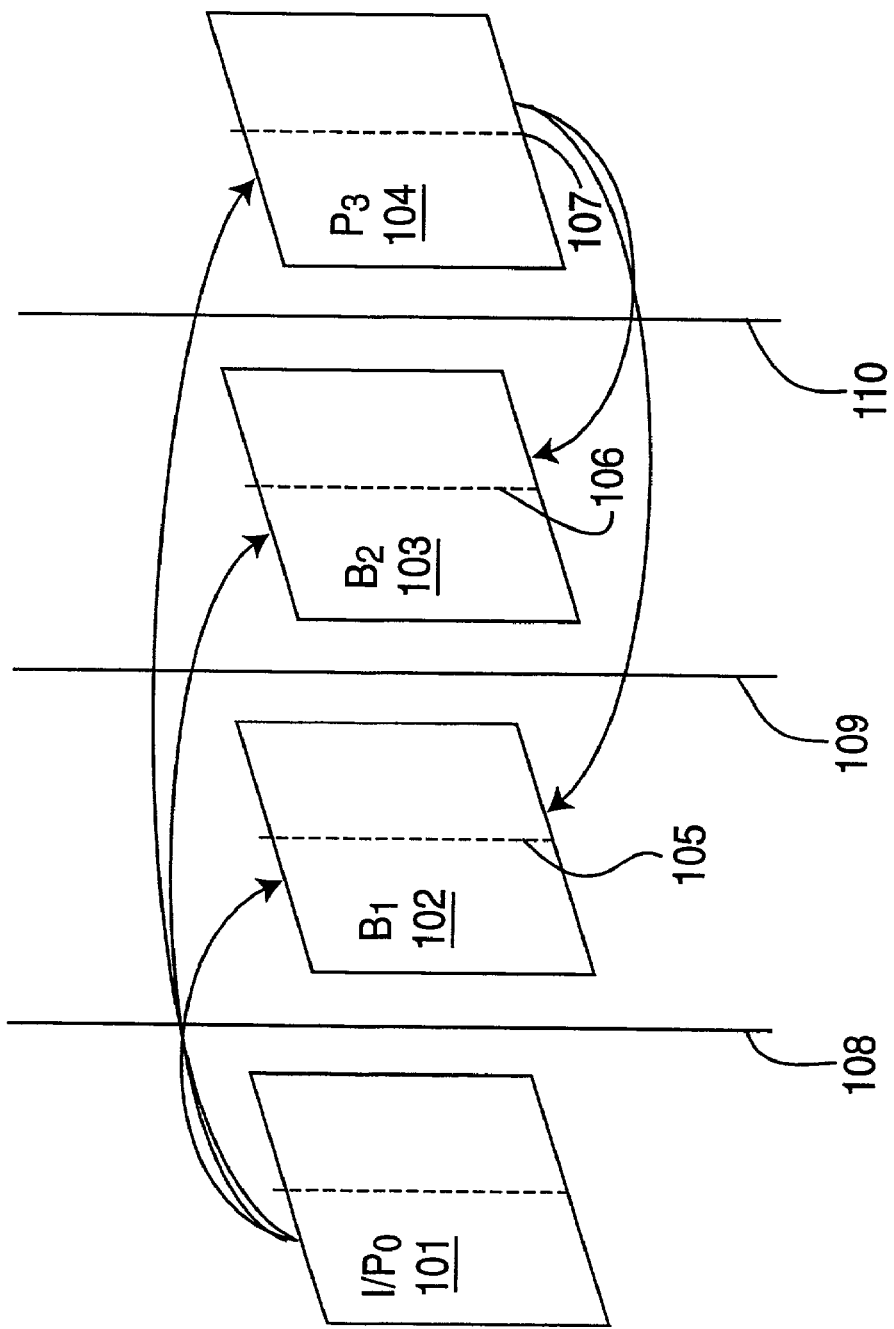
FIG. 1 illustrates exemplary scene cuts within a sub-GOP, in accordance with the principles of the present invention.

In accordance with the principles of the present invention, scene cut detection is performed by collecting data on the number of forward and backward predicted macroblocks in each Inter-Frame (P) or Bi-Directional (B) frame, analyzing them on a sub-GOP level (each anchor frame along with preceding B frames) without considering each frame independently. It is to be understood that the present invention may be implemented in various forms of hardware, software, firmware, special purpose processors, or a combination thereof. In one exemplary embodiment, the present invention is implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro-instruction code. The various processes and functions described herein may either be part of the micro instruction code or part of the application program (or a combination thereof) which is executed via the operating system. In addition, various other peripheral devices may be connected to the computer platform such as an additional data storage device(s) and a printing device(s).

It is to be further understood that, because some of the constituent system components and method steps depicted in the accompanying figures may be implemented in software, the actual connections, interconnections, or functional relationships between the system components (or the process steps) may differ depending upon the manner in which the present invention is programmed. Given the teachings of the present invention provided herein, one of ordinary skill in the related art will be able to contemplate these and similar implementations or configurations of the present invention.

For each P or B frame, the number of macroblocks employing forward prediction and the number of macroblocks employing backward prediction (found only in B frames) are recorded. The data for each anchor frame, Intra-frame (I) or P, and all immediately preceding B frames is examined.

If a macroblock is predicted improperly, the residual after motion compensation can be large, and large DCT coefficients are needed in order to compensate for the prediction. For these predictions, there is a high (about greater than 50%) likelihood that the prediction is spurious. That is, an anchor-frame macroblock on which the prediction is based may have no real association with the macroblock in the predicted frame, but the anchor-frame may be similar enough that a prediction could be made from it. For this reason, such a macroblock is ignored in gathering statistics. More particularly, when counting macroblocks with forward or backward prediction, the total energy (entropy) of the DCT coefficients is examined. The total energy of the DCT coefficients is the sum of the squares of the non-DC coefficients. If this energy is above a threshold value, the macroblock is not counted, either for the number of forward or backward predictions (nFwd and nBwd respectively), or for the number of coded macroblocks (nCode). For MPEG-2, one exemplary threshold value has been found to be about 500.

For an anchor frame, the pattern of predictions for each frame in the sub-GOP are analyzed. Consider FIG. 1, which depicts a sub-GOP including two B frames and a P frame. Potential sites for a scene cut include, before the frame $B_1$ 102, between frames $B_1$ 102 and $B_2$ 103, and between the $B_2$ 103 frame and frame $P_3$ 104. In addition, if the frames are interlaced, a scene cut may occur between the fields of any of the three frames, 105 to 107 respectively.

According to an embodiment of the present invention, if a scene cut occurs at 108, few forward-predicted macroblocks would be present in frames $B_1$ 102, $B_2$ 103, or $P_3$ 104, because frame $I/P_0$ 101 is unrelated to any of these frames. Likewise, if a scene cut occurs at 109, few backward-predicted macroblocks would be present in frame $B_1$ 102 because frame $B_1$ 102 is unrelated to frame $P_3$ 104 from which these predictions are made; and we expect few forward-predicted macroblocks in frame $B_2$ 103 or $P_3$ 104 because frame $I/P_0$ 101 is unrelated to these frames.

Thus, a measure of the likelihood of a scene cut at 108 is the total of the number of forward-predicted macroblocks in frames $B_1$ 102, $B_2$ 103, or $P_3$ 104. A measure of the likelihood of a scene cut at 109 is the total of the number of backward-predicted macroblocks in frame $B_1$ 102 plus the number of forward-predicted macroblocks in frame $B_2$ 103 and $P_3$ 104; and similarly for the likelihood of a scene cut at 110. The likelihood that there is a scene cut at the corresponding point increases as the total number of forward and backward-predicted macroblocks decreases.

Figure 2:
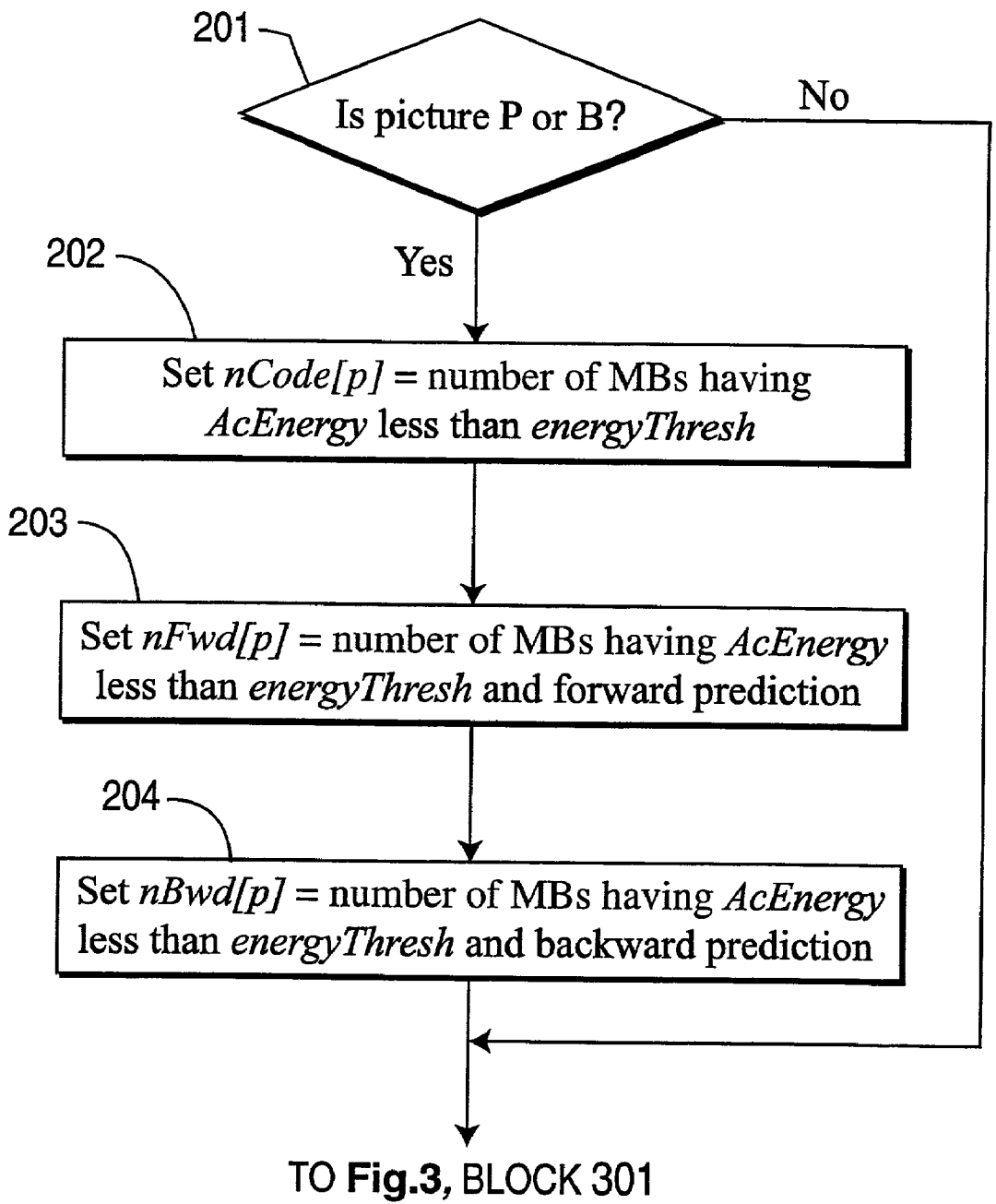
FIG. 2 is a flow chart illustrating a first method for scene cut detection, in accordance with the principles of the present invention.

Referring to FIG. 2, upon determining the current picture (p) to be a P or B frame 201, the total number of coded macroblocks in the frame (nCode[p]) is set to the number of macroblocks having an AcEnergy less than an energyThresh 202. The total number of forward predicted macroblocks for the frame (nFwd[p]) is set as the number of macroblocks having an AcEnergy less than an energyThresh AND forward prediction 203. The total number of backward predicted macroblocks for the frame (nBwd[p]) is set as the number of macroblocks having an AcEnergy less than an energy Thresh AND backward prediction 204.

Figure 3:
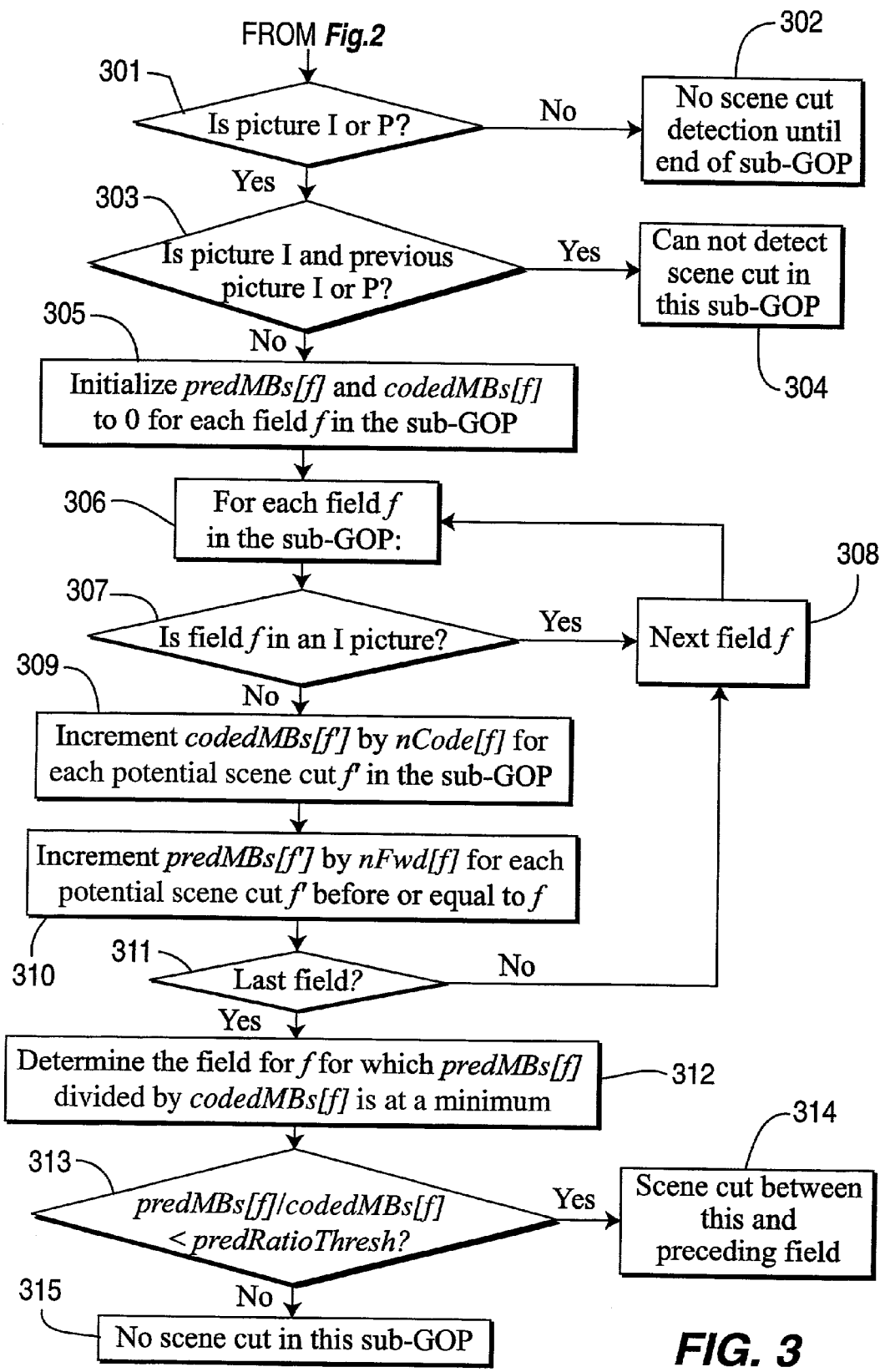
FIG. 3 is a flow chart illustrating a second method for scene cut detection, in accordance with the principles of the present invention.

Referring now to FIG. 3, in accordance with step 301, it is determined whether p is an I or P frame. If p is not an I or P frame, there is no scene cut detection until the end of the sub-GOP, in accordance with step 302. In accordance with step 303, it is determined whether p is an I frame and whether the previous picture was an I or P frame. If it is determined that the p is an I frame and the previous picture was an I or P frame, then a scene cut is not detected in this sub-GOP, in accordance with step 304. Upon determining that p is P type or that the previous picture is B type, then data is gathered regarding the current sub-GOP in steps 305–311. The count of predictions that cross the potential scene cut between field f and the preceding field (predMBs [f]) and the count of macroblocks whose predictions could cross this boundary (coded MBs[f]) are initialized to 0 for each field f in the sub-GOP, in accordance with step 305.

For each field f in the sub-GOP, it is determined whether the field f is in an I picture, in accordance with step 307. If the field f is in an I picture, then the process is continued for the next field in accordance with step 308. Upon determining that field f is not in an I picture, then the process loops over the potential sites for a scene cut in the sub-GOP, that is, each site f' between two fields. The value of codedMBs[f'] is incremented by ncode[f] for each potential scene cut f' in the sub-GOP, in accordance with step 309. Further, the value of predMBs[f'] is incremented by nFwd[f] for each potential scene cut f' before or equal to f, in accordance with step 310.

In accordance with step 311, it is determined whether the last field has been reached, and if not the process proceeds with the next field, in accordance with step 308. Upon determining that the last field has been reached, a field f for which the ratio of predMBs[f] to coded MBs[f] (e.g., predMBs[f] to coded MBs[f]) is at a minimum is determined, in accordance with step 312. For the field f determined to have the minimum ratio, if predMBs[f] divided by coded MBs[f] is less than a predRatioThresh in accordance with step 313, the process detects and reports a scene cut between this field and the preceding field, in accordance with step 314, else no scene cut is detected in the sub-GOP, in accordance with step 315.

Note that the number of predicted macroblocks (predMBs) and field coded macroblocks (codedMBs) are determined for each field, even if the pictures are frame pictures, since a scene cut may occur between fields of a frame picture (if the frame picture is interlaced). The macroblocks of a frame picture are applied to each field of the frame in computing predMBs and codedMBs. That is, nCode[f'] is the total number of coded macroblocks in the frame when f' refers to either field of the frame. Similarly, nFwd[f'] and nBwd[f'] represent the number of forward prediction macroblocks and backward prediction macroblocks in field f', respectively. When f' is in the same frame picture as f, predMBs[f] is incremented by nBwd[f], and codedMBs[f] is incremented by nCode[f'], only when f is the first field of the frame. The arrays for the second field are not incremented because forward predictions are assumed to apply to the first field only, and backward predictions to the second field only. If this were not done, a scene cut between fields of a frame picture would be masked by predictions across the scene boundary.

A good value for the prediction ratio threshold, preRatioThresh, has been found, through experimentation, to be 0.05. However, further experimentation and/or applications may determine that some value other than this value, or that a variable threshold value may be more appropriate in a specific application. Furthermore, the specific value chosen for AC energy threshold, AcThresh, may similarly be other than the exemplary value described here. It would be apparent to those skilled in the art to evaluate and modify these and other values to maximize the efficiency and accuracy of the invention, such modification still including the principles of the present invention as described herein.

The specific method described above is that which has been implemented and tested. It is not meant to limit the scope of this disclosure or the claims contained herein. An underlying principle of the present invention is the precise detection of a sharp scene cut by global examination of all the predictions within a sub-GOP. By seeking consistency of all the information available on predictions, false positives (spurious reports of scene cuts) may be reduced.

The principles of the present invention may be integrated with, for example, histogram-based approaches, to handle the cases of I-frame-only, and of a P picture followed by an I picture, in which cases this method cannot detect a scene cut. Extensions involving histograms can also be implemented to detect gradual scene transitions such as fades, dissolves, and wipes.

Having described embodiments for precise detection of a scene cut by global examination of all of the predictions within a sub-GOP, it is noted that modifications and variations can be made by persons skilled in the art in light of the above teachings. It is therefore to be understood that various changes and modifications may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for detecting scene cuts in a video bitstream comprising the steps of:
    determining a number of coded macroblocks for each of a plurality of potential scene cuts;
    determining a number of predicted macroblocks for each of the plurality of potential scene cuts;
    determining a ratio of the number of coded macroblocks to the number of predicted macroblocks for each of a plurality frames corresponding to the plurality of potential scene cuts;
    selecting a frame having a desired ratio;
    comparing the ratio to a threshold value; and
    detecting a scene cut upon determining that the ratio satisfies the threshold value.

2. The method of claim 1, further comprising the step of processing a group of frames, wherein each frame includes two fields, and wherein the group of frames comprise a sub-group of pictures and the video bitstream includes a plurality of sub-groups of pictures.

3. The method of claim 1, further comprising the step of determining whether a first frame is an I or P picture, upon determining that the first frame is not an I or P picture, advancing to a next sub-group of pictures.

4. The method of claim 1, further comprising the step of determining whether the first picture is an I picture and whether a previous picture was an I or P picture, upon determining the first picture to be a P picture or the previous picture to be a B picture, advancing to a next sub-group of pictures.

5. The method of claim 1, further comprising the steps of:
    initializing the number of predicted macroblocks to zero for each frame; and
    initializing the number of coded macroblocks to zero for each frame.

6. The method of claim 1, wherein at least one of the potential scene cuts exist between interlaced fields of a frame.

7. The method of claim 6, wherein the step of determining the number of predicted macroblocks further comprises the steps of:
    setting the number of predicted macroblocks equal to a number of forward predicted macroblocks for each potential scene cut, upon determining a corresponding field to be a first field in a frame; and
    setting the number of predicted macroblocks equal to a number of backward predicted macroblocks for each potential scene cut, upon determining the corresponding field to be a second field in the frame, wherein the frame includes the first and the second fields.

8. The method of claim 6, wherein the scene cut corresponds to the selected field.

9. The method of claim 1, wherein the desired ratio is a minimum ratio among all ratios determined.

10. The method of claim 1, wherein the potential scene cuts exists between the frames of a sub-group of pictures.

11. A method for detecting scene cuts in an MPEG video bitstream comprising the steps of:
    determining a number of coded macroblocks for each of a plurality of potential scene cuts, wherein the plurality of potential scene cuts exists between a plurality of frames and between a plurality of fields in each frame;
    setting a number of predicted macroblocks equal to a number of forward predicted macroblocks for each of the plurality of potential scene cuts, upon determining a corresponding field to be a first field in a frame, and setting the number of predicted macroblocks equal to a number of backward predicted macroblocks for each of the plurality of potential scene cuts, upon determining the corresponding field to be a second field in the frame, wherein the frame includes the first and the second fields;
    determining a ratio of the number of coded macroblocks to the number of predicted macroblocks for each of a plurality fields corresponding to the plurality of potential scene cuts;
    selecting a field having a lowest ratio among the plurality of fields;
    comparing the lowest ratio to a threshold value; and
    detecting a scene cut upon determining that the lowest ratio satisfies the threshold value, wherein the scene cut corresponds to the selected field.

12. The method of claim 11, further comprising the step of processing a group of frames, each frame including two fields, wherein the group of frames comprise a sub-group of pictures and the video bitstream includes a plurality of sub-groups of pictures.

13. The method of claim 11, further comprising the steps of:

determining whether a first frame is an I or P picture; and advancing processing to a next sub-group of pictures, responsive to a determination that the first frame is not an I or P picture.

14. The method of claim 11, further comprising the steps of:

determining whether the first picture is an I picture;

determining whether a previous picture was an I or P picture; and advancing processing to a next sub-group of pictures, responsive to a determining the first picture to be a P picture or the previous picture to be a B picture.

15. The method of claim 11, further comprising the steps of:

initializing the number of predicted macroblocks to zero for each field; and initializing the number of coded macroblocks to zero for each field.

16. The method of claim 11, wherein at least one of the plurality of potential scene cuts exist between interlaced fields of a frame.

17. A program storage device readable by machine, tangibly embodying a program of instructions executable by the machine to perform method steps for detecting scene cuts in a video bitstream, the method steps comprising:

determining a number of coded macroblocks for each of a plurality of potential scene cuts;

determining a number of predicted macroblocks for each of the plurality of potential scene cuts;

determining a ratio of the number of coded macroblocks to the number of predicted macroblocks for each of a plurality of frames corresponding to the plurality of potential scene cuts;

selecting a frame having a desired ratio;

comparing the ratio to a threshold value; and detecting a scene cut upon determining that the ratio satisfies the threshold value.

18. The method of claim 17, wherein the plurality of potential scene cuts exist between interlaced fields of a frame.

19. The method of claim 18, wherein the step of determining the number of predicted macroblocks further comprises the steps of:

setting the number of predicted macroblocks equal to a number of forward predicted macroblocks for each potential scene cut, upon determining a corresponding field to be a first field in a frame; and setting the number of predicted macroblocks equal to a number of backward predicted macroblocks for each potential scene cut, upon determining the corresponding field to be a second field in the frame, wherein the frame includes the first and the second fields.

20. The method of claim 18, wherein the scene cut corresponds to the selected field.

21. The method of claim 17, wherein the desired ratio is a minimum ratio among all ratios determined.

22. An apparatus for detecting scene cuts in a video bitstream comprising:

means for determining a number of coded macroblocks for each of a plurality of potential scene cuts;

means for determining a number of predicted macroblocks for each of the plurality of potential scene cuts;

means for determining a ratio of the number of coded macroblocks to the number of predicted macroblocks for each of a plurality frames corresponding to the plurality of potential scene cuts;

means for selecting a frame having a desired ratio;

means for comparing the ratio to a threshold value; and means for detecting a scene cut upon determining that the ratio satisfies the threshold value.

* * * * *